United States Patent [19]
Houle

[11] Patent Number: 5,435,493
[45] Date of Patent: Jul. 25, 1995

[54] MANURE DISTRIBUTOR WITH ATOP DISCHARGE PIPES AND MANURE SPREADER INCORPORATING THE SAME

[75] Inventor: Michel Houle, Wickham, Canada

[73] Assignee: J. Houle et Fils Inc., Drummondville, Canada

[21] Appl. No.: 230,722

[22] Filed: Apr. 21, 1994

[51] Int. Cl.⁶ .......................................... A01C 23/00
[52] U.S. Cl. .................................. 239/662; 239/127
[58] Field of Search ............ 239/124, 127, 662–664, 239/689

[56] References Cited

U.S. PATENT DOCUMENTS

| | | |
|---|---|---|
| 2,238,120 | 4/1941 | Launder . |
| 2,685,865 | 8/1954 | Roberts et al. . |
| 3,080,885 | 3/1963 | Webster et al. . |
| 3,512,714 | 5/1970 | Phelps et al. . |
| 3,785,779 | 1/1974 | Li et al. . |
| 4,014,271 | 3/1977 | Rohlf et al. ............... 239/662 |
| 4,032,300 | 6/1977 | Parker et al. . |
| 4,062,183 | 12/1977 | Davies et al. . |
| 4,244,522 | 1/1981 | Hartwig . |
| 4,489,892 | 12/1984 | Tyler ............................ 239/664 |
| 4,760,963 | 8/1988 | Waldrum . |
| 5,271,567 | 12/1993 | Bauer ............................ 239/662 |

FOREIGN PATENT DOCUMENTS

| | | |
|---|---|---|
| 632011 | 12/1961 | Canada . |
| 724540 | 12/1965 | Canada . |
| 1079329 | 6/1980 | Canada . |
| 1080083 | 6/1980 | Canada . |
| 1114428 | 12/1981 | Canada . |
| 1115600 | 1/1982 | Canada . |
| 322941 | 7/1989 | European Pat. Off. ............ 239/662 |
| 3623352 | 1/1988 | Germany ........................... 239/662 |
| 1189542 | 4/1970 | United Kingdom ............... 239/662 |
| 1229846 | 4/1971 | United Kingdom ............... 239/667 |
| 2059738 | 4/1981 | United Kingdom ............... 239/662 |

Primary Examiner—Karen B. Merritt
Attorney, Agent, or Firm—Robic

[57] ABSTRACT

A distributor for use in a liquid manure spreader to distribute manure to a plurality of discharge hoses via a manifold fed by a manure feed pipe connected to a manure pump. The distributor has a cylindrical chamber connected to the manifold above the same. This chamber has a bottom wall with a central inlet in open communication with the manifold and a top wall provided with a set of equally spaced apart outlets. An annular baffle is mounted within the cylindrical chamber, so as to better distribute the incoming manure within the chamber. The distributor also has a set of atop discharge pipes connecting each outlet of the cylindrical chamber to a corresponding discharge hose. Each discharge pipe includes a first, vertically extending portion, a middle horizontally extending portion, a last vertically extending portion and a vertically extending, upwardly projecting air vent connected to the middle portion of the discharge pipe at substantially mid-length of it in order to prevent unequal vacuuming of the corresponding discharge hose. If desired, the distributor may further incorporate a shredder kit to allow spreading of manure containing some bedding.

20 Claims, 5 Drawing Sheets

MANURE DISTRIBUTOR WITH ATOP DISCHARGE PIPES AND MANURE SPREADER INCORPORATING THE SAME

BACKGROUND OF THE INVENTION a) Field of the Invention

The present invention relates to an improved manure distributor especially devised to supply a constant volume of manure to each of a set of gravity discharge hoses via a corresponding set of discharge pipes mounted atop of it.

The invention also relates to a liquid manure spreader incorporating this improved distributor.

b) Brief Description of the Prior Art

Most of the liquid manure spreaders presently available on the market comprise a distributor for use to distribute manure fed by a pump into a plurality of discharge hoses having their ends fixed in spaced apart position onto a tool bar supporting or not some agricultural tools such as shank cultivating rigs, concave disc incorporators or ground injectors.

The distributors of these known spreaders usually comprise a manure feed pipe operatively connected to a manure feed pump having its inlet located within the manure tank of the spreader. It also comprises a manifold to which the discharge pipes are directly connected, and a return pipe for returning any excess of manure fed into the manifold back to the tank.

A major problem with this known distributor is that the inlets of the discharges pipes are usually connected to the manifold at given intervals and thus at different distances from the feed pipe. Moreover, the inlets of the discharge pipes are oriented at an angle of 90° relative to the main axis of the manifold through which manure circulates. As a result, there is always some difference between the volumes of manure supplied to the different discharge hoses, because of the loss of pressure of the manure that is fed, along the manifold.

To solve this problem, Canadian patent no. 1,115,600 issued in 1982 to Jim SHANER proposes a manure distributor comprising a hollow casing having a cylindrical upper portion and a frusto-conical lower portion. Manure is fed centrally on top of the upper portion by means of a hollow cone spray nozzle, and is divided equally into the lower portion which is partitioned to define a plurality of radially extending compartments to which the discharge hoses of the manure spreader are connected. Since the openings of discharge hoses are oriented in the same direction as the outlet of the feed pipe and are equally spaced apart with respect to the same, substantially equal quantities of manure enter the compartments and thus are fed to the discharge hoses.

The basic idea of using a cylindrical casing or chamber wherein a liquid is fed at one end through a central inlet and is removed at the other end via a plurality of outlets positioned at a same radial distance from the inlet, is also well known in related arts, such as gardening, for equally distributing a non-viscous liquid such as an insecticide, to a plurality of spray hoses. In this connection, reference can be made to Canadian patent no. 724,540 issued on 1965 to THE HYGRAND CORPORATION. Reference can also be made to Canadian patent nos. 1,079,329 and 1,114,428 and to U.S. Pat. No. 3,080,885.

OBJECTS AND SUMMARY OF THE INVENTION

A first object of the present invention is to provide an improved distributor especially devised for equally distributing a liquid or a viscous material, like a liquid manure containing or not some bedding, to a plurality of discharge hoses.

Another object of the invention is to provide a manure spreader incorporating this improved distributor.

More particularly, in accordance with the invention as mentioned hereinabove, a distributor is provided for use in a liquid manure spreader to distribute manure to a plurality of discharge hoses via a manifold fed by a manure feed pipe connected to a manure pump, this distributor comprising:

(a) a cylindrical chamber connectable to the manifold above the same, this chamber having a substantially vertical axis, a bottom wall with a central inlet opening in open communication with the manifold when the chamber is connected thereto, and a top wall provided with a set of spaced apart outlet openings extending at a same radial distance away from the vertical axis, each outlet opening corresponding to one of the discharge hoses;

(b) an annular baffle coaxially mounted within the cylindrical chamber, this baffle having a radius shorter in size than the radial distance at which extend the outlet openings, and an upper edge adjacent to the top wall of the chamber, the baffle being shorter in height than the chamber but wider in diameter than the central inlet opening; and (c) a set of atop discharge pipes for connecting each of said outlet openings of the cylindrical chamber to the corresponding discharge hose, each atop discharge pipe comprising:

a first, vertically extending portion projecting upwardly from the top wall of the cylindrical chamber, this first portion having a lower end in open communication with the corresponding outlet opening, and an upper end;

a middle, substantially horizontally extending portion having a pair of opposite ends, one of these opposite ends being in open communication with the upper end of the first portion;

a last, vertically extending portion having an upper end in open communication with the other opposite end of the middle portion and a lower end connectable to the corresponding discharge hose so as to be in open communication therewith; and a vertically extending, upwardly projecting air vent connected to the middle portion of the discharge pipe at substantially mid-length of the middle portion in order to prevent unequal vacuuming of the corresponding discharge hose as compared to the others.

The fact that manure is fed vertically upwardly within the chamber of the distributor is of the uppermost importance, since such an upward feeding results in a uniform gravity elevation and distribution of the manure within the chamber and thus within each of the discharge pipes without need of any restrictors, partitions and/or other distribution means, like those called for in Canadian patent no. 1,115,600. As a matter of fact, the only "means" that is actually needed to achieve excellent distribution of the manure is essentially static and consists of the annular baffle mounted on top of the chamber within the same to cause the incoming manure flowing up to be diverted down and then be equally distributed all around the periphery of the chamber before gravity elevating up again towards the discharge pipes.

The fact that the air vent is located substantially in the middle of the horizontally extending portion of each discharge pipe, is also of the uppermost importance. Indeed, it has been found that if the discharge pipe does not have a horizontal portion on top of it and/or if the air vent is not located in the middle of this horizontal portion, then the air vent becomes rapidly clogged and its efficiency to prevent one discharge pipe from "drafting" manure from the others, is substantially reduced.

If desired, the distributor according to the invention may also comprise a shredder kit to allow spreading of manure containing some bedding. Preferably, this kit may comprises:

- a disk-shaped rotor coaxially mounted within the chamber, this rotor extending adjacent to the top wall of the chamber and having the upper edge of the annular baffle rigidly fixed thereto;
- a motor which is preferably hydraulic and is externally mounted onto the top wall of the chamber and operatively connected to the rotor for rotating the same; and
- a set of knives symmetrically mounted onto the rotor, these knives projecting radially outwardly from the rotor so as extend flat against the top wall of the chamber and pass over the outlet openings when the rotor is rotated by the motor.

Preferably, the knives have front edges radially extending at an angle and a surface area smaller than the one of the outlet openings within the top wall of the chamber so as to never completely close said outlet openings when passing over the same, and thus to prevent pulsation of the discharge hoses.

Preferably also, the motor is devised to rotate back at least one turn when a tool bar to which the discharge hoses are connected is lifted up, so as to allow removal of any material that could be stuck in the outlet openings and/or knives.

In accordance with the invention, a liquid manure spreader is also provided, which comprises:

- a manure tank preferably mounted on a wheeled chassis hitchable to a farm tractor;
- a manure pump having an inlet within the tank and outlet connected to a manure feed pipe;
- a manifold extending substantially horizontally, the manifold being fed at one end by the feed pipe;
- a distributor as defined hereinabove, which is operatively mounted on top of the manifold downstream of the feed pipe;
- a set of discharging hoses connected to the atop discharge pipes of the distributor;
- a manure return pipe connected to the manifold downstream of the distributor to return excess of manure fed to the manifold back to the tank; and
- a manure flow regulator in the return pipe to control the amount of manure supplied to the distributor.

The invention and its advantages will be better understood upon reading of the following non-restrictive description of a preferred embodiment thereof made with reference to the accompanying drawings.

DESCRIPTION OF A PREFERRED EMBODIMENT OF THE INVENTION

Figure 1:
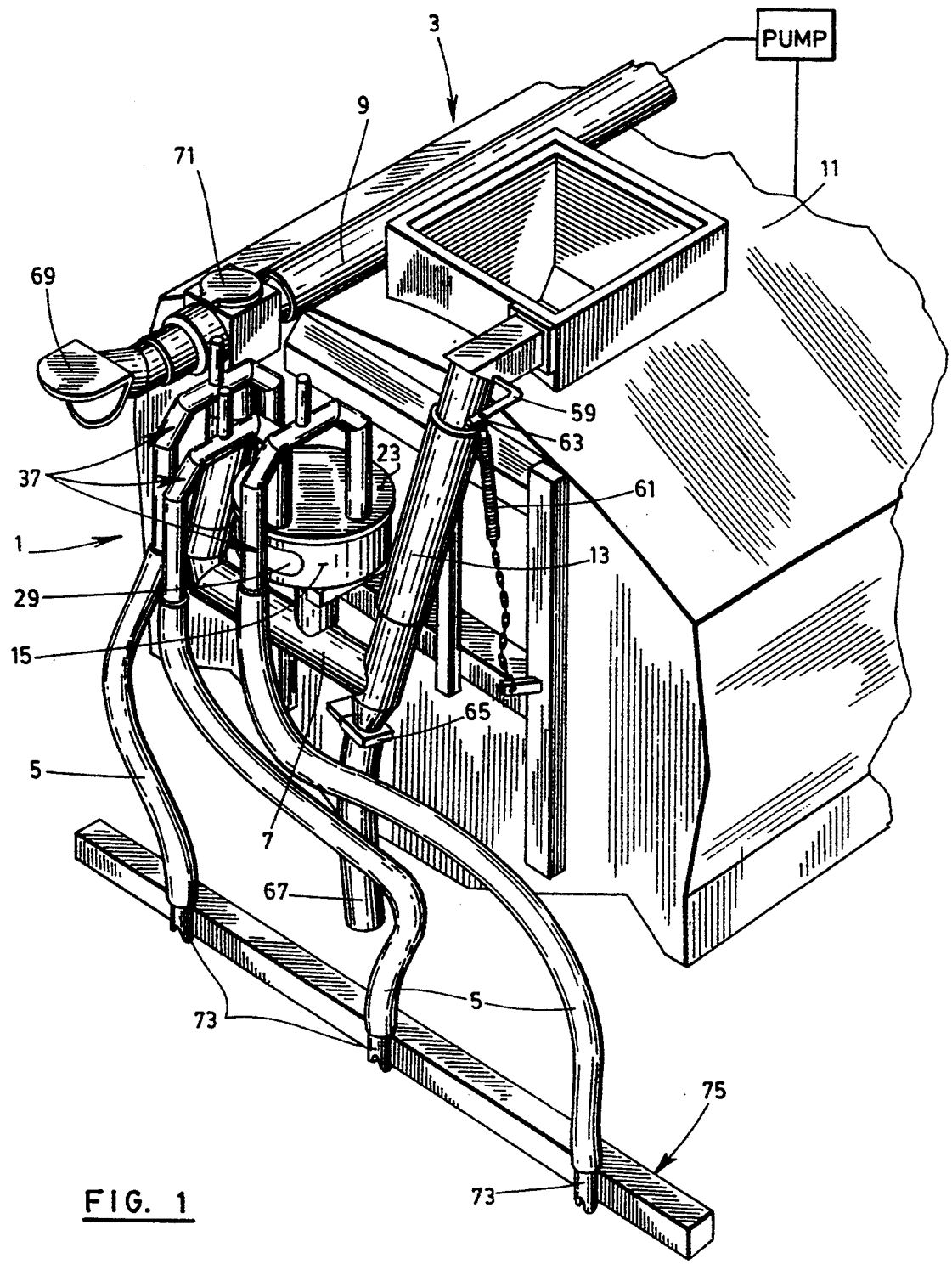
FIG. 1 is a perspective view of part of the rear of a liquid manure spreader equipped with a distributor according to the invention.

As aforesaid, the distributor 1 according to the invention is intended to be used in a liquid manure spreader 3 in order to distribute manure to a plurality of discharge hoses 5 via a manifold 7 fed by a manure feed pipe 9 connected to a manure pump (not shown) usually mounted at the front of the spreader.

More particularly, the distributor is intended to be used in a liquid manure spreader 3 of the type comprising a manure tank 11 mounted onto a wheeled chassis operatively hitchable to a farm tractor, and a manure pump (not shown) having an inlet located within the tank and an outlet connected to the manure feed pipe 9 which is itself connected to one end of the manifold 7. As is shown, the manifold 7 extends substantially horizontally and has the distributor 1 operatively mounted on its top, usually downstream of the feed pipe 9. The spreader 3 also comprises a manure return pipe 13 connected to the manifold 7 downstream of the distributor 1 in order to return any excess of manure fed to the manifold back to the tank 11.

Figure 2:
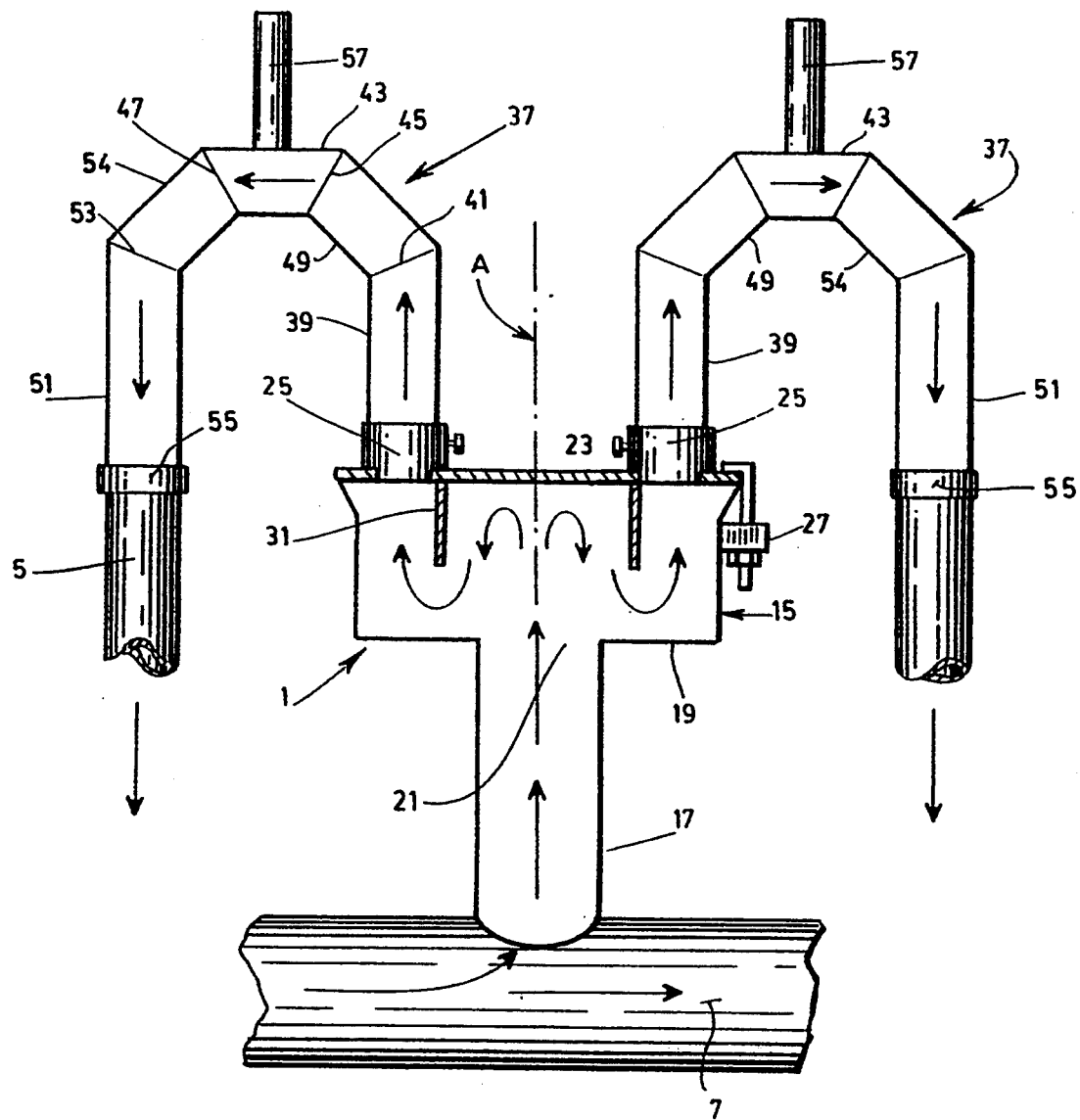
FIG. 2 is a cross-sectional, elevational view of the distribution chamber of the distributor shown in FIG. 1.

As better shown in FIG. 2, the distributor 1 has a cylindrical chamber 15 connected by a short pipe 17 to the manifold 7 above the same. The chamber 15 has a substantially vertical axis "A", a bottom wall 19 with a central inlet opening 21 in open communication with the manifold 7 via the pipe 17 and a top wall 23 provided with a set of spaced apart outlet openings 25 extending at a same radial distance away from the vertical axis A, each of the outlet openings corresponding to one of the discharge hoses 5.

As is clearly shown in FIG. 2, the top wall 23 of the chamber is removably fixed to the same by means of bolts and nuts 27. This feature substantially facilitates the maintenance of the distributor. If desired, the chamber 15 may also be provided with one or more easy-to-reach inspection doors (one behind, shown as 29 in FIG. 1 and one underneath, not shown), to see inside the distributor. These inspection doors could be used to remove foreign objects that could get in the distributor.

The distributor 1 also comprises an annular baffle 31 coaxially mounted within the cylindrical chamber 15 so as to cause the incoming manure flowing in to be diverted down and then be equally distributed all around the periphery of the chamber before elevating up again evenly towards the discharge openings 25. As clearly shown in FIG. 3, the baffle 31 has a radius shorter in size than the radial distance at which extend the outlet openings 25, and an upper edge 33 adjacent to the top wall 23 of the chamber. As is also shown, the baffle 31 is and must of course be shorter in height than the chamber but wider in diameter than the central inlet opening 21 so as to provide the requested manure distribution within the chamber.

A set of three and preferably four to six atop discharge pipes 37 are provided for connecting each of the outlet openings 25 of the cylindrical chamber 15 to a corresponding discharge hose 5. As shown, each discharge pipe 37 has an inverted U-shape and comprises:
- a first, vertically extending portion 39 projecting upwardly from the top wall 23 of the cylindrical chamber, the first portion having a lower end in open communication with the corresponding outlet opening 25 and an upper end 41;
- a middle, horizontally extending portion 43 having a pair of opposite ends 45,47, one 45 of the opposite ends being in open communication with the upper end 41 of the first portion via an angular connection 49; and
- a last, vertically extending portion 51 having an upper end 53 in open communication with the other opposite end 47 of the middle portion 43 via another angular connection 54, and a lower end 55 connectable to the corresponding discharge hose 5 so as to be in open communication therewith.

A vertically extending, upwardly projecting air vent 57 is connected to the middle portion 43 of the discharge pipe at substantially mid-length thereof in order to prevent unequal vacuuming of the corresponding discharge hose 5 as compared to the others.

It is worth mentioning that, instead of being made of a plurality of straight portions connected to each other, each discharge pipe 37 could be made of a single tube continuously bent along a curve to form an inverted U. In such a case, it remains compulsory that the upwardly projecting air vent be at substantially mid-length of the curved portion of the tube, i.e. at its highest point, to prevent unequal vacuuming.

As aforesaid, the fact that the air vent is located substantially in the middle of the horizontally extending portion of the discharge pipe is of the uppermost importance. Indeed, it has been found that if the discharge pipe does not have a horizontal portion on top of it and/or if the air vent is not located in the middle of this horizontal portion, then the air vent becomes rapidly clogged and its efficiency to prevent one discharge pipe from "drafting" manure from the others, is substantially reduced.

Advantageously, the atop discharge pipes 37 are made dismountable to facilitate maintenance of the distributor.

In use, the pump of the spreader supplies a constant volume of manure to the feed pipe 9. The manure, once through the manifold 7, is allowed to enter the distributor 1 and also to return in the spreader through the manure return pipe 13. The amount of manure which enters the distributor 1 is then divided evenly into the atop discharges.

In order to control the amount of manure supplied to the distributor, an adjustable manure flow regulator is provided in the return pipe 13 to reduce its diameter and thus to adjust the supply of manure to the distributor 1.

Figure 6:
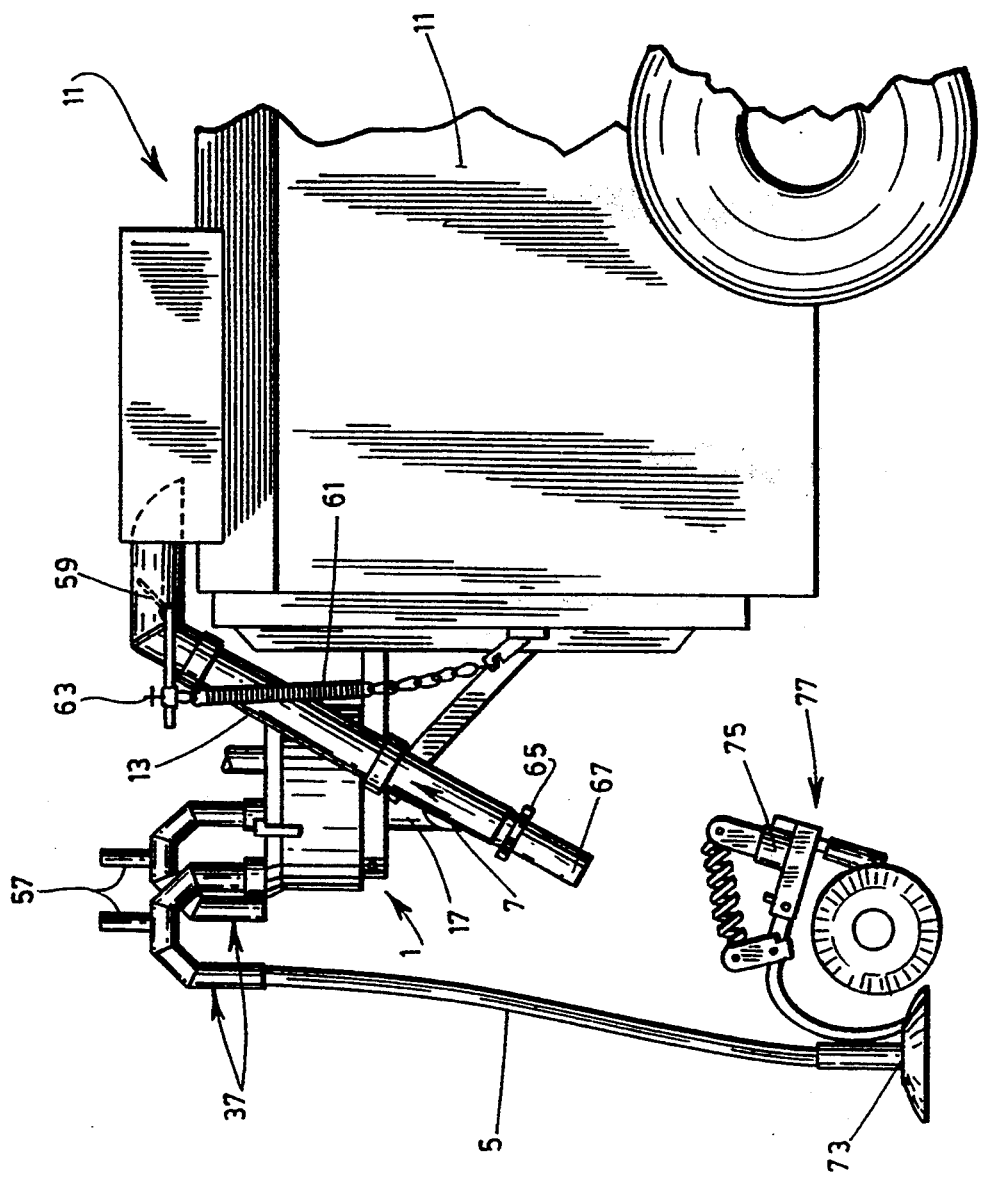
FIG. 6 is a side elevational view of the rear of the liquid manure spreader shown in FIG. 1, with a tool bar supporting a plurality of ground injectors.

As shown-in FIG. 1 and 6, the manure flow regulator preferably consists of a manually adjustable, Spring-loaded flapper valve 59 mounted within the return pipe.

To increase the volume of manure entering the distributor 1 and at the same time to decrease the volume of manure going back in the spreader 3, one can increase the tension of the spring 61 biasing the valve 59 by sliding the spring attachment 63 away from the pivot of the valve.

To decrease the volume of manure fed to the distributor and at the same time increase the volume of manure going back in the spreader, one can slide the spring attachment 63 closer to the pivot of the valve 59 and thus decrease the tension of the regulator spring 61.

As also shown in FIGS. 1 and 6, a distributor drain gate valve 65 can be mounted within a drain pipe 67 connected at one end of the manifold 7, so as to drain the same and the distributor 1 whenever desired.

A manure spraying nozzle 6a connected to the manure feed pipe 9 usually upstream of the manifold 7, and a directional valve 71 can also be provided to direct the manure circulating through the feed pipe toward the nozzle 69 whenever desired.

Referring back to FIG. 1, the discharge hoses 5 may have their outlet ends 73 fixed in spaced apart position onto a tool bar 75 connected to the spreader 3 so as to spread the manure equally over the length of the tool bar. The tool bar can support a plurality of floating cultivating rigs (not shown), a plurality of concave disc incorporators (not shown) or a plurality of ground-penetrating injectors 77 (as shown in FIG. 6) to which the outlet ends of the discharge hoses 5 may be suitably connected to allow injection of manure directly into the ground, thereby reducing odors and nutrient loss. The tool bar 75 may have folding ends to allow a wider spreading patterns and may be ether "floating"or "pressurized" to transfer a given amount of weight on the injectors, cultivators rigs or incorporators and thus to give them enough penetration strength, as is known per se.

Figure 3:
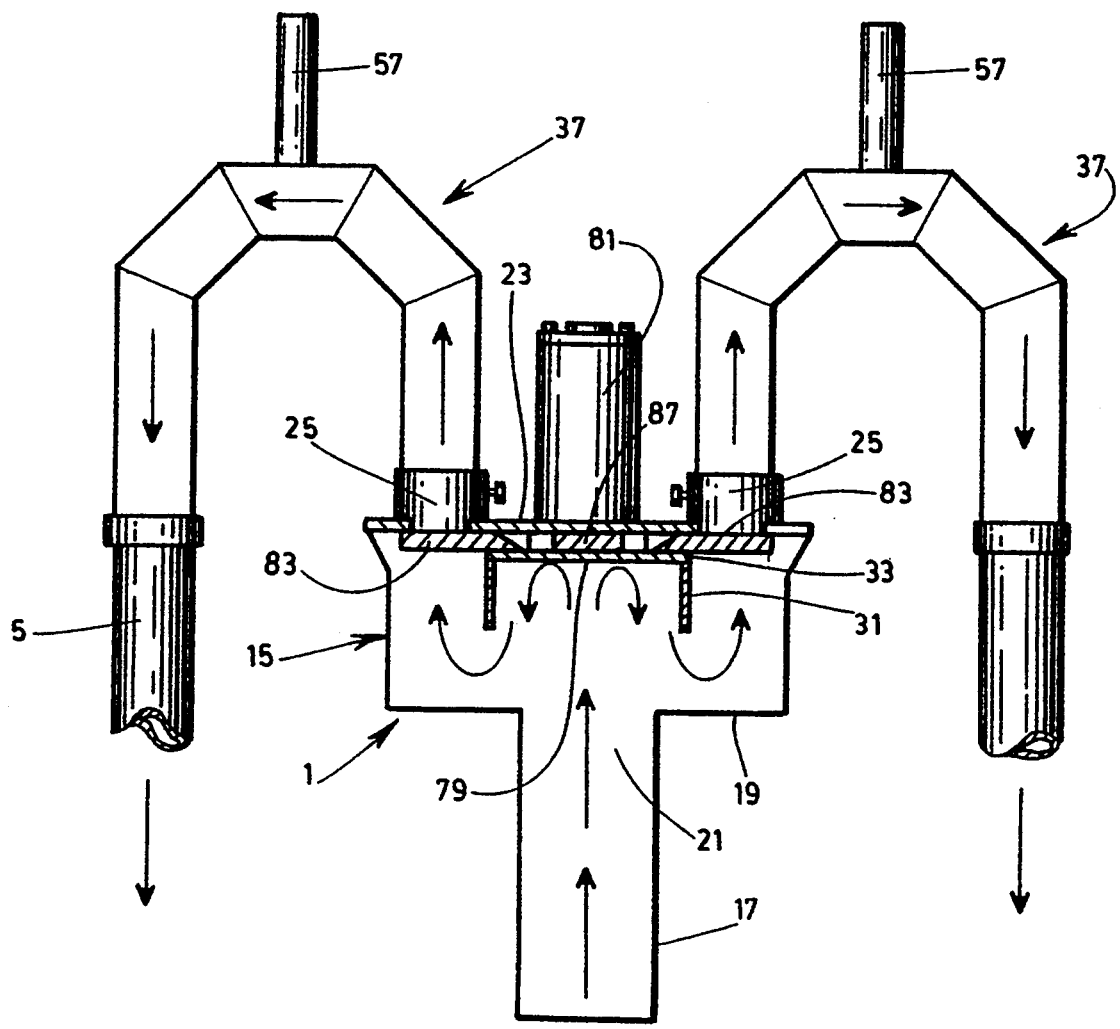
FIG. 3 is a view similar to FIG. 2, showing a variant of the invention wherein the distributor also comprises a shredder kit to handle manure containing some bedding.
Figure 4:
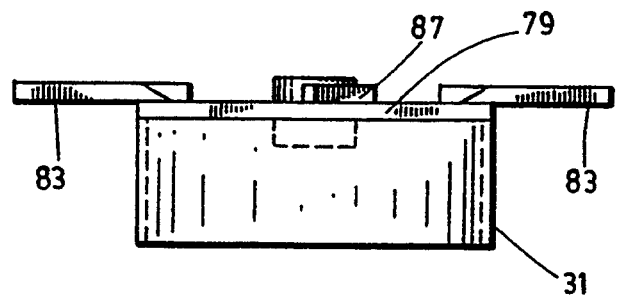
FIG. 4 is a side elevational view of the rotor, knives and baffle assembly of the distributor shown in FIG. 3.
Figure 5:
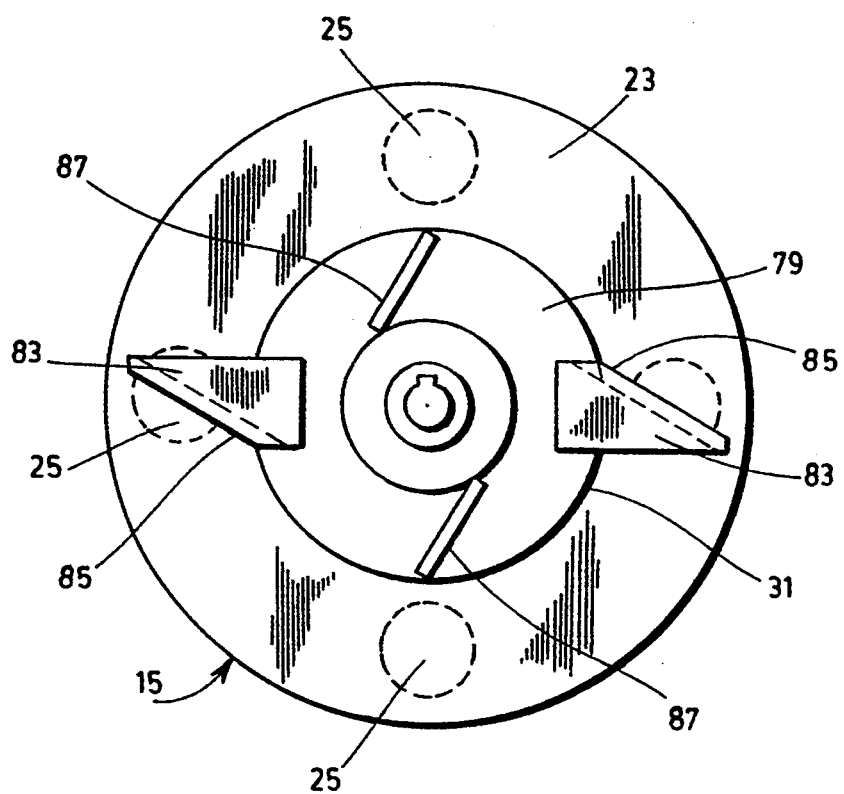
FIG. 5 is a bottom plan view of the top wall of the chamber of the distributor shown in FIG. 3, showing the position and size of the knives of the shredder kit relative to the outlet openings made in this top wall.

In accordance with a preferred embodiment of the invention shown in FIGS. 3 to 5, the distributor 1 may further comprises a shredder kit to allow spreading of manure containing some bedding. This kit comprises a disk-shaped rotor 79 coaxially mounted within the chamber 15 so as to extend adjacent to the top wall 23 of this chamber. As is shown, the upper edge 33 of the annular baffle 31 rigidly fixed to the bottom of the rotor 79 so as to rotate therewith.

This kit also comprises a motor 81 externally mounted onto the top wall 23 of the chamber and operatively connected to the rotor 79 for rotating the same. The kit further comprises a set of two or more knives 83 symmetrically mounted onto the rotor. As shown, the knives 83 project radially outwardly from the rotor and extend flat against the top wall 23 so as to pass over the outlet openings 25 when the rotor 79 is rotated by the motor 81. Advantageously, each of the knives has a front edge 85 radially extending at an angle and a surface area smaller than the one of the outlet openings 25 of the top wall 23 so as to never completely close these outlet openings when passing over the same and thus to prevent pulsation of the discharge hoses 5. More particularly, each knife 83 preferably has a blade that is triangular in shape. Advantageously, the rotor 79 may also comprise two or more scrappers 87 mounted on top of it, so as to remove any manure from between the top surface of the rotor and the top wall 23.

The motor is preferably hydraulic and devised to rotate back at least one turn when the tool bar 75 is lifted so as to allow removal of any material stuck in or between the outlet openings 25 and knives 83.

Advantageously, the hydraulic shredder kit can be tied in with the hydraulic circuit of the tool bar so that only one hydraulic lever from the tractor is required to power the assembly.

Of course, numerous modifications could be made to the above described embodiment of the invention without departing from the scope of the same as defined in the appended claims.

I claim:

1. A distributor for use in a liquid manure spreader to distribute manure to a plurality of discharge hoses via a manifold fed by a manure feed pipe connected to a manure pump, said distributor comprising:

(a) a cylindrical chamber connectable to the manifold above the same, said chamber having a substantially vertical axis, a bottom wall with a central inlet opening in open communication with the manifold when said chamber is connected thereto, and a top wall provided with a set of spaced apart outlet openings extending at a same radial distance away from said vertical axis, each of said outlet openings corresponding to one of said discharge hoses;

(b) an annular baffle coaxially mounted within said cylindrical chamber, said baffle having a radius shorter in size than said radial distance and an upper edge adjacent to the top wall of the chamber, said baffle being shorter in height than said chamber but wider in diameter than said central inlet opening;

(c) a set of atop discharge pipes connecting each of said outlet openings of the cylindrical chamber to a corresponding discharge hose, each of said atop discharge pipes comprising:

a first, vertically extending portion projecting upwardly from the top wall of the cylindrical chamber, said first portion having a lower end in open communication with the corresponding outlet opening, and an upper end;

a middle horizontally extending portion having a pair of opposite ends, one of said opposite ends being in open communication with the upper end of the first portion;

a last, vertically extending portion having an upper end in open communication with the other opposite end of the middle portion and a lower end connectable to the corresponding discharge hose so as to be in open communication therewith; and a vertically extending, upwardly projecting air vent connected to the middle portion of the discharge pipe at substantially mid-length of said middle portion in order to prevent unequal vacuuming of the corresponding discharge hose as compared to the others.

2. The distributor of claim 1, further comprising:

(a) a shredder kit to allow spreading of manure containing some bedding, said kit comprising:

a disk-shaped rotor coaxially mounted within the chamber, said rotor extending adjacent to the top wall of said chamber and having the upper edge of said annular baffle rigidly fixed thereto;

a motor externally mounted onto the top wall of the chamber and operatively connected to the rotor for rotating the same; and a set of knives symmetrically mounted onto said rotor, said knives projecting radially outwardly from said rotor so as extend flat against said top wall and pass over said outlet openings when the rotor is rotated by the motor.

3. The distributor of claim 2, wherein each of said knives has a front edge radially extending at an angle and a surface area smaller than any one of the outlet openings of the top wall of said chamber so as to never completely close said outlet openings when passing over the same to prevent pulsation of the discharge hoses.

4. The distributor of claim 3, wherein said motor is hydraulic and devised to rotate back at least one turn when stopped so as to allow removal of any material stuck in the outlet openings and knives.

5. The distributor of claim 4, comprising two of said knives symmetricaly mounted onto said rotor, each of said knives having a blade triangular in shape, and wherein said rotor comprises at least two scrappers mounted on top of it so as to remove any manure from between said rotor and said top wall.

6. The distributor of claim 5, wherein the top wall of the chamber is removably fixed to the same by means of bolts and nuts.

7. A liquid manure spreader, comprising:

a manure tank;

a manure pump having an inlet within said tank and an outlet connected to a manure feed pipe;

a manifold extending substantially horizontally, said manifold being fed at one end by said feed pipe;

a set of discharging hoses;

a distributor operatively mounted on top of the manifold downstream of the feed pipe, said distributor comprising:

(a) a cylindrical chamber connectable to the manifold above the same, said chamber having a substantially vertical axis, a bottom wall with a central inlet opening in open communication with the manifold when said chamber is connected thereto, and a top wall provided with a set of spaced apart outlet openings extending at a same radial distance away from said vertical axis, each of said outlet openings corresponding to one of said discharge hoses;

(b) an annular baffle coaxially mounted within said cylindrical chamber, said baffle having a radius shorter in size than said radial distance and an upper edge adjacent to the top wall of the chamber, said baffle being shorter in height than said chamber but wider in diameter than said central inlet opening;

(c) a set of atop discharge pipes connecting each of said outlet openings of the cylindrical chamber to a corresponding discharge hose, each of said atop discharge pipes comprising:

a first, vertically extending portion projecting upwardly from the top wall of the cylindrical chamber, said first portion having a lower end in open communication with the corresponding outlet opening, and an upper end;

a middle horizontally extending portion having a pair of opposite ends, one of said opposite ends being in open communication with the upper end of the first portion;

a last, vertically extending potion having an upper end in open communication with the other opposite end of the middle portion and a lower end connectable to the corresponding discharge hose so as to be in open communication therewith; and a vertically extending, upwardly projecting air vent connected to the middle portion of the discharge pipe at substantially mid-length of said middle portion in order to prevent unequal vacuuming of the corresponding discharge hose as compared to the others;

a manure return pipe connected to the manifold downstream of the distributor to return excess manure fed to the manifold back to the tank; and a manure flow regulator in the return pipe to control the amount of manure supplied to the distributor.

8. The manure spreader of claim 7, wherein the flow regulator consists of a manually adjustable, spring-loaded flapper valve mounted within the return pipe.

9. The manure spreader of claim 8, wherein the discharge hoses have ends fixed in spaced apart position onto a tool bar connected to the spreader so as to spread the manure equally over the length of said tool bar.

10. The manure spreader of claim 8, wherein the discharge hoses have ends respectively fixed to ground-penetrating injectors mounted in spaced apart positions onto a tool bar operatively connected to the spreader so as to allow injection of the manure directly into the ground.

11. The manure spreader of claim 8, further comprising a shredder kit to allow spreading of manure containing some bedding, said kit comprising:

a disk-shaped rotor coaxially mounted within the chamber, said rotor extending adjacent to the top wall of said chamber and having the upper edge of said annular baffle rigidly fixed thereto;

a motor externally mounted onto the top wall of the chamber and operatively connected to the rotor for rotating the same; and a set of knives symmetrically mounted onto said rotor, said knives projecting radially outwardly from said rotor so as to extend flat against said top wall and pass over said outlet openings when the rotor is rotated by the motor.

12. The manure spreader of claim 11, wherein each of said knives has a front edge radially extending at an angle and a surface area smaller than any one of the outlet openings of the top wall of said chamber so as to never completely close said outlet openings when passing over the same and thus to prevent pulsation of said discharge hoses.

13. The manure spreader of claim 12, wherein the discharge hoses have ends fixed in spaced apart position onto a liftable tool bar connected to the spreader and wherein said motor is hydraulic and devised to rotate back at least one turn when the tool bar is lifted so as to allow removal of any material stuck in the outlets opening and knives.

14. The manure spreader of claim 13, comprising two of said knives symmetrically mounted onto said rotor, each of said knives having a blade triangular in shape, and wherein said rotor comprises at least two scrappers mounted on top of it so as to remove any manure from between said rotor and said top wall.

15. The manure spreader of claim 14, further comprising a distributor drain gate valve mounted in said manifold to drain the distributor through the manifold whenever desired.

16. The manure spreader of claim 15, further comprising a manure spraying nozzle connected to said manure feed pipe upstream of said manifold, and a directional valve to direct the manure circulating through the feed pipe toward said nozzle whenever desired.

17. The manure spreader of claim 16, wherein the top wall of the chamber is removably fixed to the same by means of bolts and nuts.

18. The manure spreader of claim 8, further comprising a distributor drain gate valve mounted in said manifold to drain the distributor through the manifold whenever desired.

19. The manure spreader of claim 8, further comprising a manure spraying nozzle connected to said manure feed pipe upstream of said manifold, and a directional valve to direct the manure circulating through the feed pipe toward said nozzle whenever desired.

20. The manure spreader of claim 8, wherein the top wall of the chamber is removably fixed to the same by means of bolts and nuts.

* * * * *